United States Patent Office 3,058,696
Patented Oct. 16, 1962

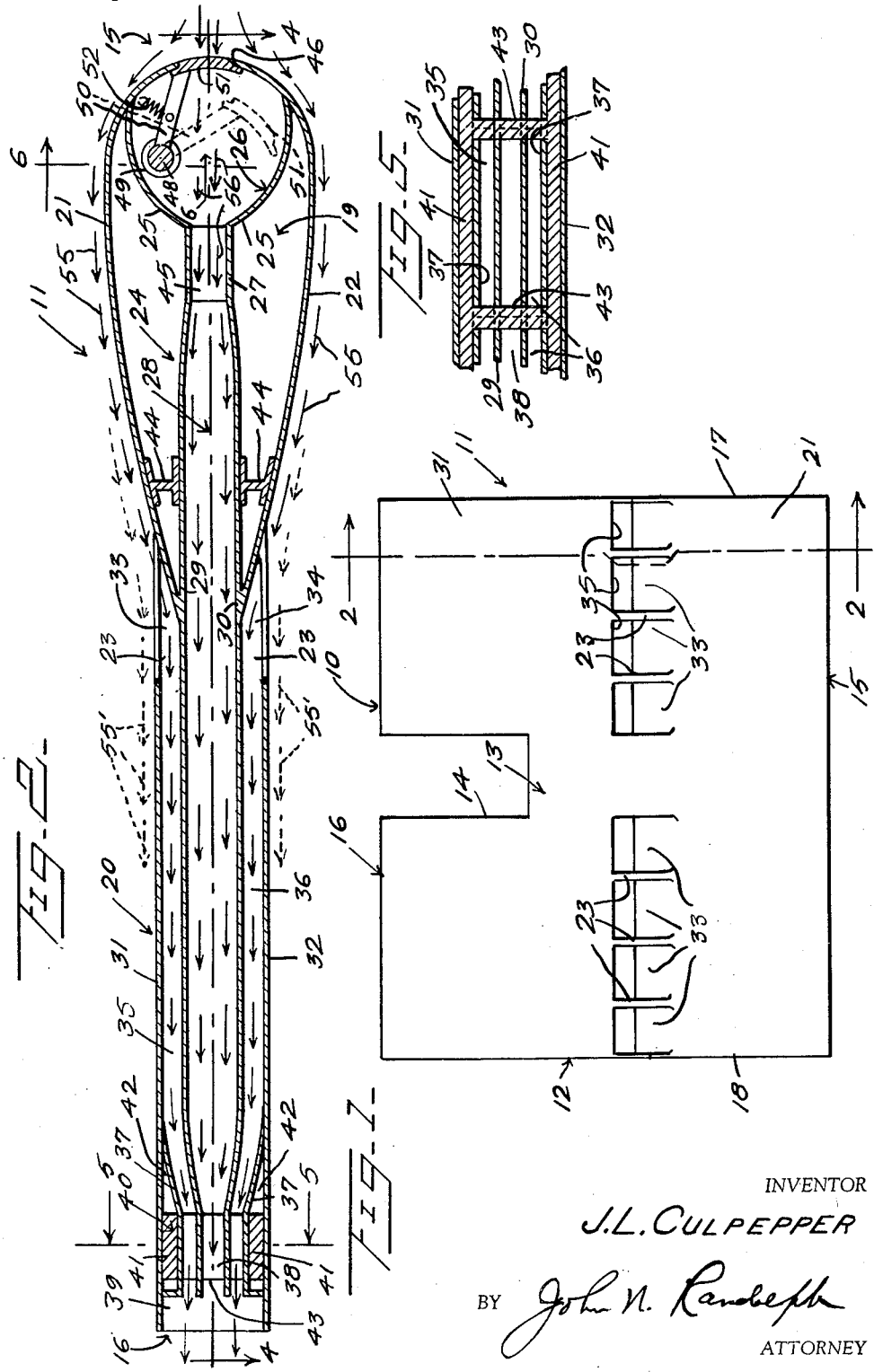

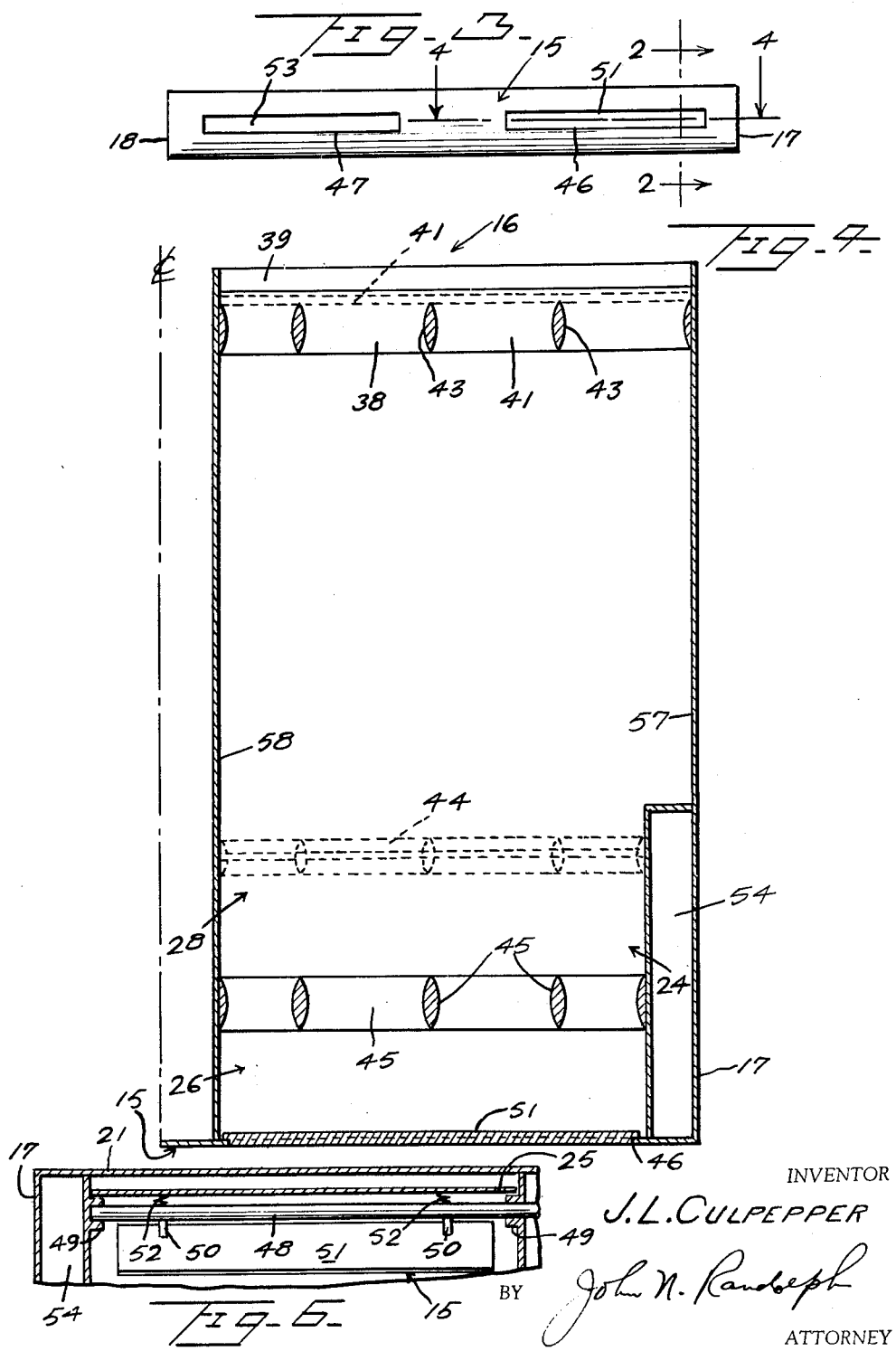

3,058,696
HIGH STABILITY AIRCRAFT WING WITH
BOUNDARY AIR CONTROL
James L. Culpepper, 4558 Arcady Ave., Dallas 5, Tex.
Filed Sept. 18, 1961, Ser. No. 138,814
7 Claims. (Cl. 244—42)

This invention relates to an aircraft wing possessing a unique airfoil design capable of affording increased flight stability for aircraft equipped with lift means by which the aircraft can rise and descend nearly vertical.

Another object of the invention is to provide an aircraft wing structure which readily adapts itself to use with aircraft which take off and land obliquely and which are intended to fly at low speeds.

Another object of the invention is to provide a wing structure of much greater width between its leading edge and trailing edge than conventional aircraft wing structures, which employs a very thick airfoil section to provide flight stability and which includes means for reducing the effective thickness of the wing structure for reducing drag and controlling boundary air at higher speeds.

Another object of the invention is to provide a wing structure which will enable a safe transition from vertical rise to forward substantially horizontal flight and wherein the large wing area between the trailing and leading edges, which advantageously functions for damping out violent and sudden vertical motions during vertical movement and caused by the lift means of the aircraft, will not adversely affect the capacity of the wing structure to function as an airfoil during horizontal flight.

Various other objects and advantages of the invention will hereinafter become more fully apparent from the following description of the drawings, ilustrating a presently preferred embodiment thereof, and wherein:

FIGURE 1 is a top plan view of a wing structure constructed in accordance with the invention;

FIGURE 2 is an enlarged transverse sectional view thereof through the wing structure from the leading edge to the trailing edge thereof, taken substantially along a plane as indicated by the line 2—2 of FIGURE 1;

FIGURE 3 is a front elevational view of the wing structure;

FIGURE 4 is an enlarged horizontal sectional view taken through a part of the wing structure;

FIGURE 5 is a fragmentary sectional view taken longitudinally through a part of the wing structure, substantially along a plane as indicated by the line 5—5 of FIGURE 2, and FIGURE 6 is a sectional view through a part of the wing structure adjacent to and along the leading edge thereof, and substantially along a plane as indicated by the line 6—6 of FIGURE 2, and on a reduced scale.

Conventional aircraft wings are relatively narrow between the leading and trailing edges thereof. This is essential in such angle of attack type wings having a substantially flat underside which is inclined downwardly from the leading edge to the trailing edge of the wing and a cambered upper side, in order to maintain the boundary layer of air over the upper side of the wing and which is necessary for flight stability. In such wing structures, the air passing under the wing is accelerated and in passing beyond the trailing edge of the wing is deflected downwardly. This produces a low pressure area on the upper side of the wing, near its trailing edge, which maintains a laminar flow or boundary layer of air which passes over the cambered upper side of the wing in close proximity thereto and in a path closely corresponding to the contour of the upper surface of the wing. This boundary layer is essential to the flight stabality of the aircraft of which the wing forms a part.

The present invention, due to its unique features, hereinafter to be described, eliminates the necessity of having a wing which is relatively narrow between its leading edge and trailing edge, so that the wing can effectively function to afford stability for the aircraft while it is rising or descending substantially vertical in response to the operation of a lift fan or the like, yet which will also function effectively to provide maximum stability to the aircraft while it is in horizontal flight by maintaining a boundary layer or laminar flow of air not only across the upper side but also across the underside of the wing and without the aid of a trailing wing edge.

The wing structure in its entirety is designated generally 10 and includes corresponding wing sections 11 and 12 connected by a central portion 13 to which a fuselage, not shown, is secured and which central portion may have a rearwardly opening notch 14 to accommodate a part of the fuselage. As clearly illustrated in FIGURE 1, the width of the wing structure between its leading edge 15 and its trailing edge 16 may be nearly as great as the length of the wing structure between the tips 17 and 18 of the wing sections 11 and 12, respectively.

As seen in FIGURE 2, each wing section has a forward or leading part 19 and a rearward or trailing part 20. The forward part 19, which extends from the leading edge 15, terminates nearer said leading edge than the trailing edge 16. The forward or leading part 19 constitutes an airfoil having an upper camber 21 and, preferably, a lower camber 22 which is identical with or mirrors said upper camber. The rear or trailing section 20 is of a thickness substantially less than the maximum thickness of the forward section 19 and is provided with forwardly and rearwardly extending vertical ribs 23 the forward ends of which connect with the rear ends of the cambers 21 and 22.

Each of the wing sections 11 and 12 has a passage, designated generally 24 extending substantially from its leading edge 15 to its trailing edge 16. The passage 24 has a flared forward portion 25 which joins with the cambers 21 and 22 to provide a mouth 26 of the passage 24 which is located in the leading edge 15 and which is substantially larger in cross section than the remainder of the passage 24. The passage 24 includes a throat 27 which opens into the rear part of the mouth 26 and which constitutes a restricted forward end of the passage portion 28 which extends rearwardly from said throat to near the trailing edge 16 and which passes through a substantial part of the wing portions 19 and 20. The rear ends of the chambers 21 and 22 merge and join with a top wall 29 and bottom wall 30 of the passage portion 28, which walls are disposed between and maintained spaced from the upper surface or skin 31 and the lower surface or skin 32 of the rear wing portion 20 by said ribs 23. The skins or walls 31 and 32 terminate rearwardly of the rear ends of the cambers 21 and 22, between the ribs 23, to form inlet openings 33 and 34. The openings 33 constitute the open forward ends of passages 35 located between the walls 29 and 31 and between the ribs separating said walls, and which passages are thus located above the passage 24. Similarly, the openings 34 define inlets of passages 36 located between the walls 30 and 32 and the ribs 23 which separate said walls. The passage 24 is located between walls 57 and 58 of the wing section 11, and which extend from the leading edge 15 to the trailing edge 16. Wall 57 constitutes the wing tip 17 and wall 58 constitutes a side of the intermediate portion 13 located adajacent thereto.

The skins or walls 31 and 32 have internal plies 37 disposed near the trailing edge 16. The passage portion 28 has a restricted open rear outlet end 38 which is disposed between the plies 37 and which opens into a rearwardly opening chamber 39 of the trailing edge 16, which is located immediately behind said plies 37. The outlet 38 is smaller than the throat 27. The passages 35 and 36 also discharge into the chamber 39 and are curved by the plies 37 so that the rear ends thereof, which straddle the outlet 38, are located in closer proximity to one another than the remainder of said passages.

The trailing wing portion 20 is braced by a spar 40 having parallel tensile-compression members 41 which occupy chambers 42, which are formed by and located between the skin plies 37 and the skins 31 and 32 of which plies form a part, and truss members 43. The truss members 43 of the spar 40 pass across the outlet 38 and the rear ends of the passages 35 and 36 and are streamlined, as seen in FIGURE 4.

The forward wing part 19 is preferably provided with spars 44 located between the wall 29 and the upper camber 21 and the wall 30 and the lower camber 22. The spars 44 are disposed rearwardly of the throat 27. The throat 27 may be reinforced by spacers 45, as seen in FIGURES 2 and 4, which are of the same streamlined shape as the truss members 43.

As best seen in FIGURE 3, the leading edge of the wing structure 10 contains two longitudinally spaced, longitudinally elongated slots 46 and 47. The slot 46 is of a length coextensive with the width of the passage 24 and communicates with the mouth 26 of said passage and extends from end-to-end thereof. The slot 47 is similarly related to a passage, not shown, corresponding to the passage 24 and contained in the wing section 12.

A shaft 48 is disposed in and extends from end-to-end of the mouth 26 and is supported and journaled in the upper part thereof in bearings 49. At least two arms 50 extend from the shaft 48 and a valve or shutter 51 is connected to and supported by the free ends of said arms and is of a proper length in cross sectional shape to close the slot 46. At least one spring 52 yieldably retains the valve 51 in a closed position. The spring 52 may be anchored to a portion of the leading edge 15, above the slot 46, and connected to one of the arms 50 for urging the shaft 48 to turn counterclockwise, as seen in FIGURE 2, to move with the valve 51 to its closed full line position from its open dotted line position of this view. Preferably, the shaft 48 extends across the intermediate portion 13 and to adjacent the outer end of the slot 47 to support a second valve 53, in the same manner as the valve 51, and so that the valves 51 and 53 will open and close in unison by oscillation of the shaft 48.

Each of the wing tips 17 and 18 may be equipped with a fuel tank, one of which tanks 54 is shown in FIGURE 4, located in the forward part 19 of the wing section 11.

The camber 21 is similar to the camber of the upper surface of a conventional angle of attack-type wing; however, since the wing structure 10 is primarily designed to provide stability rather than lift, the lower surface of the front part 19 has the camber 22 which mirrors the camber 21 to thereby further prove the stability afforded by the wing structure. This is rendered most effective due to the fact that the wing structure is normally disposed in a horizontal plane while the aircraft is in flight. Since the cambers 21 and 22 effectively function to insure stability during horizontal flight so long as the boundary layer or laminar air flow is maintained around the cambers 21 and 22, as indicated by the solid arrows 55 in FIGURE 2, the trailing part 20 of the wing requires no special stabilizing means. Accordingly, the trailing portion 20 can extend to a considerable distance behind the rear edges of the cambers 21 and 22 so long as the trailing edge is not essential to retain the laminar air flow 55.

Assuming that the wing structure 10 is moving in substantially a horizontal plane from left to right, as seen in FIGURE 2, the air deflected from the leading edge 15 will flow around the cambers 21 and 22. A low pressure area will be created in the rearwardly opening chamber 39 by the overhang of the skins or walls 31 and 32 to create low pressure areas within the passages 35 and 36 and at the inlets 33 and 34, so that the air passing around the cambers 21 and 22 will closely follow the contours thereof, rather than separating therefrom, as indicated by the broken arrows 55', since the air will be attracted toward the inlets 33 and 34 by the low pressure in said areas, affording the paths of least resistance of the air flow 55. This boundary air control will effectively function to prevent upward or downward displacement of the leading wing section 19.

The air passing around the cambers 21 and 22 from the leading edge 15 is greatly accelerated, and as this acceleration is increased by more rapid forward movement of the wing structure 10, the tendency of the air to separate from the cambers due to centrifugal force, rather than to follow the laminar flow paths as represented by the solid arrows 55, increases. In order to prevent the leading airfoil section 19 ceasing to function at higher speeds to maintain stability and to insure boundary air control at such higher speeds, the slots 46 and 47 and the control valves 51 and 53 thereof are provided.

As the speed increases, the air pressure at the leading edge 15 also increases. At a predetermined speed and when a predetermined pressure exists at the leading edge 15, the springs 52 will yield to allow the valves 51 and 53 to be forced to open positions by the pressure against the outer sides of said valves. Both valves will move simultaneously from the solid line to the dotted line position of the valve 51 as shown in FIGURE 2, to expose the slots 46 and 47 to allow the air to enter therethrough and thereby reduce the pressure in front of the leading edge 15. When this occurs the air will enter the passage mouth 26 through the slot 46, as indicated by the arrows 56, and will pass rearwardly through the throat 27 and the passage portion 28 to the passage outlet 38. This air as represented by the arrows 56 will be accelerated in passing through the restricted outlet 38 to enhance the low pressure in the chamber 39 and in the passages 35 and 36, so that air will be more effectively drawn through the passages 35 and 36 to maintain the laminar air flows 55 around the cambers 21 and 22 to thus provide an effective boundary air control at higher speeds. The opening of the valves 51 and 53, in addition to maintaining the boundary air control at higher speeds, also reduces the effective thickness of the forward airfoil part 19 and thus reduces the drag of the wing structure at higher speeds where less camber is required to insure flight stability.

While the wing structure 10 is primarily intended to provide stability rather than to sustain the aircraft so that it will normally be disposed in a horizontal position, as seen in FIGURE 2, in an emergency the wing structure may be inclined downwardly and rearwardly to sustain the aircraft, similar to a conventional angle of attack-type airfoil. However, normally, a part of the air which separates from the laminar air flow 55, above and beneath the wing, as illustrated by the broken arrows 55', will flow along the upper and lower surfaces 31 and 32, respectively, of the trailing section 20. If the wing is not in a horizontal plane, this air flow will impinge against the surface 31, if said surface is inclined downwardly and forwardly, or against the surface 32, if said surface is inclined upwardly and forwardly, to urge the wing to resume its horizontal plane as seen in FIGURE 2.

Various modifications and changes are contemplated and may be resorted to, without departing from the function or scope of the invention as hereinafter defined by the appended claims.

I claim as my invention:

1. An aircraft wing section having a leading edge and a trailing edge and including a leading part and a trailing part, said leading part extending from said leading edge and having an upper camber and a lower camber, said cambers having converging rear ends defining the rear end of said leading part, said trailing part extending from said trailing edge toward the leading edge and being provided with upper and lower passages, said passages having open forward ends opening outwardly of upper and lower sides of the wing section behind and forwardly of the convergent rear ends of said cambers for receiving laminar air flow moving around the cambers, and said trailing part having a rearwardly opening chamber defining said trailing edge and into which rear ends of said passages open.

2. An aircraft wing section as in claim 1, said wing section having an internal top wall and an internal bottom wall extending from adjacent the leading edge to adjacent the trailing edge thereof and including parts disposed between said passages, said walls defining an internal passage having a rearwardly opening discharge end opening into said chamber between the open rear ends of said first mentioned passages, and said leading part having a slot opening through said leading edge and communicating with the forward end of said internal passage.

3. An aircraft wing section as in claim 2, and normally closed pressure responsive valve means closing said slot and adapted to open in response to a predetermined pressure in advance of said leading edge for varying the effective thickness of the wing section and for maintaining boundary control of the laminar air flow around said cambers.

4. An aircraft wing section as in claim 3, said internal passage including means for accelerating the air discharged therefrom into said chamber for creating low pressure areas within said chamber adjacent the open rear ends of the first mentioned passages.

5. An aircraft wing section as in claim 4, said last mentioned means including a restriction of said air passage at the discharge end thereof, and the open rear ends of said first mentioned passages being offset toward one another and being disposed above and beneath said restricted discharge end of the internal passage.

6. An aircraft wing section as in claim 1, said trailing section being of substantially uniform thickness and of a thickness substantially less than the maximum thickness of said leading part and greater than the thickness of the leading part as defined by the convergent rear edges of said cambers.

7. An aircraf wing section as in claim 1, and slots defining the open forward ends of said passages and located nearer said leading edge than said trailing edge.

References Cited in the file of this patent
UNITED STATES PATENTS
2,266,529    Wright _____ Dec. 16, 1941
FOREIGN PATENTS
14,296/28    Australia _____ July 9, 1928